(12) United States Patent
Park (10) Patent No.: US 9,992,844 B2
(45) Date of Patent: Jun. 5, 2018

(54) POWER SUPPLY CIRCUIT AND ELECTROLUMINESCENT DISPLAY DEVICE INCLUDING THE SAME

(71) Applicant: SAMSUNG DISPLAY CO., LTD., Yongin, Gyeonggi-Do (KR)

(72) Inventor: Sung-Chun Park, Suwon-si (KR)

(73) Assignee: Samsung Display Co., Ltd., Yongin, Gyeonggi-do (KR)

(*) Notice: Subject to any disclaimer, the term of this patent is extended or adjusted under 35 U.S.C. 154(b) by 685 days.

(21) Appl. No.: 14/546,161

(22) Filed: Nov. 18, 2014

(65) Prior Publication Data

US 2016/0014857 A1 Jan. 14, 2016

(30) Foreign Application Priority Data

Jul. 8, 2014 (KR) .................. 10-2014-0085428

(51) Int. Cl.
*H05B 37/02* (2006.01)
*H05B 39/04* (2006.01)
*H05B 41/36* (2006.01)
*H05B 33/08* (2006.01)
*G09G 3/36* (2006.01)

(52) U.S. Cl.
CPC ....... *H05B 33/0896* (2013.01); *G09G 3/3696* (2013.01); *G09G 2330/028* (2013.01)

(58) Field of Classification Search
CPC ............ H05B 33/0896; H05B 33/0815; H05B 33/0845
See application file for complete search history.

(56) References Cited

U.S. PATENT DOCUMENTS

| 2011/0273109 | A1  | 11/2011 | Park |
|---|---|---|---|
| 2011/0273427 | A1  | 11/2011 | Park |
| 2012/0293562 | A1* | 11/2012 | Park ................. G09G 3/3233 345/690 |
| 2013/0147697 | A1* | 6/2013  | Sung ................ G02F 1/136204 345/87 |
| 2014/0063865 | A1  | 3/2014  | Nate |

FOREIGN PATENT DOCUMENTS

| KR | 10-2004-0038992 A | 5/2004 |
|---|---|---|
| KR | 10-2011-0123008 A | 11/2011 |
| KR | 10-2011-0123983 A | 11/2011 |

* cited by examiner

*Primary Examiner* — Douglas W Owens
*Assistant Examiner* — Laura Yesildag
(74) *Attorney, Agent, or Firm* — Lee & Morse, P.C.

(57) ABSTRACT

A power supply circuit has a first voltage converter and a second voltage converter. The first voltage converter generates a first power supply voltage having a first voltage level based on an input voltage. The first power supply voltage drives a first power node of a display in a first mode. The second voltage converter generates a second power supply voltage having a second voltage level based on the input voltage. The second power node is driven by the second power supply voltage in the first mode and is driven by a ground voltage in a second mode.

18 Claims, 10 Drawing Sheets

POWER SUPPLY CIRCUIT AND ELECTROLUMINESCENT DISPLAY DEVICE INCLUDING THE SAME

CROSS REFERENCE TO RELATED APPLICATION

Korean Patent Application No. 10-2014-0085428 filed on Jul. 8, 2014, and entitled, "Power Supply Circuit and Electroluminescent Display Device Including the Same," is incorporated by reference herein in its entirety.

BACKGROUND

1. Field

One or more embodiments described herein relate to a power supply circuit and an electroluminescent display device including the power supply circuit.

2. Description of the Related Art

Various types of displays have been developed. Examples include liquid crystal displays, plasma displays, and electroluminescent displays. An electroluminescent display has pixels that emit light using light-emitting diodes or an organic light-emitting diodes (OLEDs). Such a display is driven with quick response speed and reduced power consumption.

An OLED includes a light-emitting layer between anode and cathode electrodes. The light-emitting layer emits lights depending on current flowing from the anode to the cathode electrode. The brightness of the displayed image is based on a driving current (e.g., the sum of currents) respectively flowing through the OLED in each pixel. As brightness increases, greater driving current is required. Variances in the driving current may cause a non-uniformity which degrades image quality.

SUMMARY

In accordance with one embodiment, a power supply circuit includes a first voltage converter to generate a first power supply voltage having a first voltage level based on an input voltage, the first power supply voltage to drive a first power node of a display in a first mode and in a second mode; and a second voltage converter to generate a second power supply voltage having a second voltage level based on the input voltage, a second power node of the display to be driven by the second power supply voltage in the first mode and to be driven by a ground voltage in the second mode. The first voltage level is a positive voltage level, and the second voltage level is a negative voltage level.

The second voltage converter may apply the ground voltage to the second power node based on a first delay time, after the second power node is disconnected from the second power supply voltage, when switching from the first mode to the second mode. The second voltage converter may apply the second power supply voltage to the second power node based on a second delay time, after the second power node is disconnected from the ground voltage, when switching from the second mode to the first mode.

The second voltage converter may include a main driver to generate the second power supply voltage having the second voltage level based on the input voltage, and to control an electrical connection between the second power node and the second power supply voltage in response to a main driving signal; a ground driver to control an electrical connection between the second power node and the ground voltage in response to a ground driving signal; and a controller to control operations of the main driver and the ground driver.

The ground driver may include a ground driving switch connected between the second power node and the ground voltage, the ground driving switch to turn on in response to the ground driving signal. The controller may activate the ground driving signal based on a first delay time, after the main driving signal is deactivated, when switching from the first mode to the second mode. The first delay time may be based on a voltage of the second power node.

The controller may activate the main driving signal based on a second delay time, after the ground driving signal is deactivated, when switching from the second mode to the first mode. The ground driver may include a discharging circuit connected between the second power node and the ground voltage, the discharging circuit to turn on in response to a discharging signal; and a ground driving switch connected between the second power node and the ground voltage, the ground driving switch to be turned on in response to the ground driving signal.

The controller may activate the discharging signal at a first time, and may activate the ground driving signal at a second time after the first time, when switching from the first mode to the second mode. The turn-on resistance of the discharging circuit may be greater than a turn-on resistance of the ground driving switch.

The discharging circuit may include a discharging switch to turn on in response to the discharging signal; and a resistor connected in series with the discharging switch between the second power node and the ground voltage. The ground driver may include a discharging circuit connected between the second power node and the ground voltage, the discharging circuit to turn on in response to a discharging signal; a ground driving switch connected between the second power node and the ground voltage, the ground driving switch to turn on in response to the ground driving signal; and a comparator to compare a voltage on the second power node with a reference voltage to generate a comparison signal.

The controller may activate the discharging signal at a first time, and the ground driving signal at a second time after the first time, when switching from the first mode to the second mode, and a turn-on resistance of the discharging circuit is greater than a turn-on resistance of the ground driving switch. The discharging circuit may turn on in response to the discharging signal and to turn off in response to the comparison signal. A turn-on timing of the ground driving switch may be based on the comparison signal.

The ground driver may include a ground driving switch connected between the second power node and the ground voltage, the ground driving switch to turn on in response to the ground driving signal; and a diode connected between the second power node and the ground voltage. The main driver may be enabled after the second power node is stabilized with a clamp voltage of the diode when switching from the second mode to the first mode. The diode may protect inner circuits from an electrostatic discharge (ESD).

In accordance with another embodiment, an electroluminescent display device includes a display panel connected between a first power node and a second power node, the display panel including a plurality of pixels disposed in rows and columns; a first voltage converter to generate a first power supply voltage having a first voltage level based on an input voltage, the first power supply voltage to drive the first power node in a first mode and in a second mode; and a second voltage converter to generate a second power supply voltage having a second voltage level based on the input voltage, wherein the second power node is driven by the second power supply voltage in the first mode and is driven by a ground voltage in the second mode. The second voltage converter may switch from the first mode to the second mode, or from the second mode to the first mode, while the display panel is displaying a valid image. The first voltage level may be a positive voltage level, and the second voltage level may be a negative voltage level.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

Figure 1:
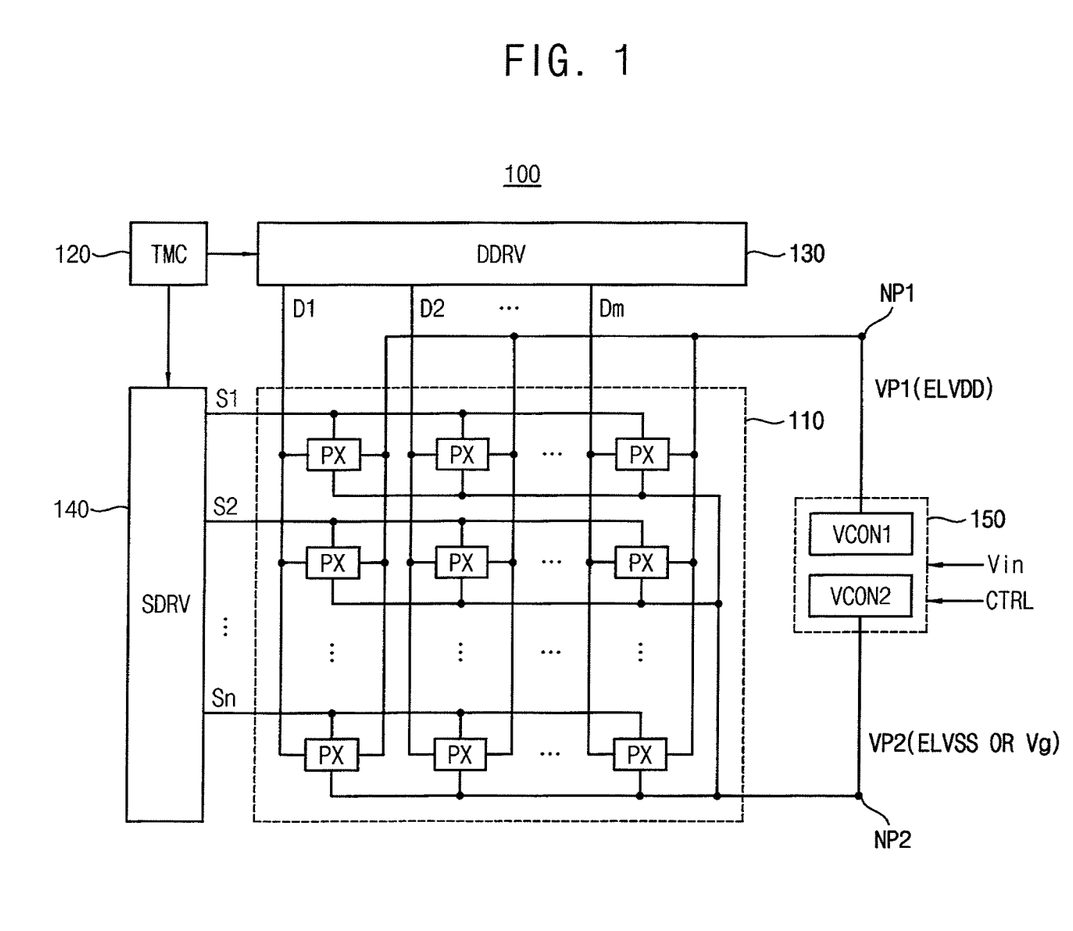
FIG. 1 illustrates an embodiment of an electroluminescent display.

FIG. 1 illustrates an embodiment of an electroluminescent display device 100 which includes a display panel 110, a timing controller (TMC) 120, a data driver (DDRV) 130, a scan driver (SDRV) 140 and a power supply circuit 150. The electroluminescent display 100 may also include a buffer for storing image data to be displayed and/or other information.

The display panel 110 includes a plurality of pixels PX or pixel circuits disposed in rows and columns. For example, the pixels PX may be arranged in a matrix of n rows and m columns as illustrated in FIG. 1. The display panel is connected to the data driver 130 through data lines D1~Dm, and to the scan driver 140 through scan lines S1~Sn. The display panel 110 is connected between a first power node NP1 and a second power node NP2, and is powered by the power supply circuit 150.

The power supply circuit 150 may operate based on control signals CTRL. At least a portion of the control signals CTRL may be provided from the timing controller 120. The control signals CTRL may include signals representing an operation mode of the power supply circuit and/or operation parameters. For example, the control signals CTRL may include a mode signal MOD as in FIG. 5. A main driving signal MDR, a ground driving signal GDR, and a discharging signal FD in FIG. 5 may be generated in the power supply circuit 150 based on the control signals CTRL.

As illustrated in FIG. 1, the power supply circuit 150 may include a first voltage converter VCON1 and a second voltage converter VCON2. An input voltage Vin provided to the power supply circuit 150 may be a DC voltage such as a battery voltage. The first and second voltage converters VCON1 and VCON2 may be DC-DC converters. The first voltage VCON1 converter may be a boost converter and the second voltage converter VCON2 may be an inverting buck-boost converter.

The first voltage converter VCON1 generates a first power supply voltage ELVDD having a positive voltage level based on the input voltage Vin to drive the first power node NP1 with the first power supply voltage ELVDD. A voltage VP1 on the first power node NP1 may be substantially the same as the first power supply voltage ELVDD.

The second voltage converter VCON2 generates a second power supply voltage ELVSS, having a negative voltage level based on the input voltage Vin, to drive the second power node NP2 with the second power supply voltage ELVSS in a first mode. The second voltage converter VCON2 drives the second power node NP2 with a ground voltage Vgnd in a second mode. A voltage VP2 on the second power node NP2 may be substantially the same as the second power supply voltage ELVSS in the first mode and the ground driving voltage Vg in the second mode. As described below, the second voltage converter VCON2 may be implemented such that the difference between the ground voltage Vgnd and the ground driving voltage Vg is very small.

The data driver 130 may provide data signals to the display panel 110 through the data lines D1~Dm. The scan driver 140 may provide row control signals to the display panel 110 through the scan lines S1~Sn. The pixels PX may be located where the data lines D1~Dm and the scan lines S1~Sn cross.

The timing controller 120 may control overall operations of the electroluminescent display 100. The timing controller 120 provides control signals to control the display unit 110, the data driver 130, the scan driver 140, and the power supply circuit 150. In one embodiment, the timing controller 120, the data driver 130, the scan driver 140, and the power supply circuit 150 are implemented as a single integrated circuit (IC). In another embodiment, the timing controller 120, the data driver 130, the scan driver 140, and the power supply circuit 150 are implemented as two or more ICs.

Figure 2:
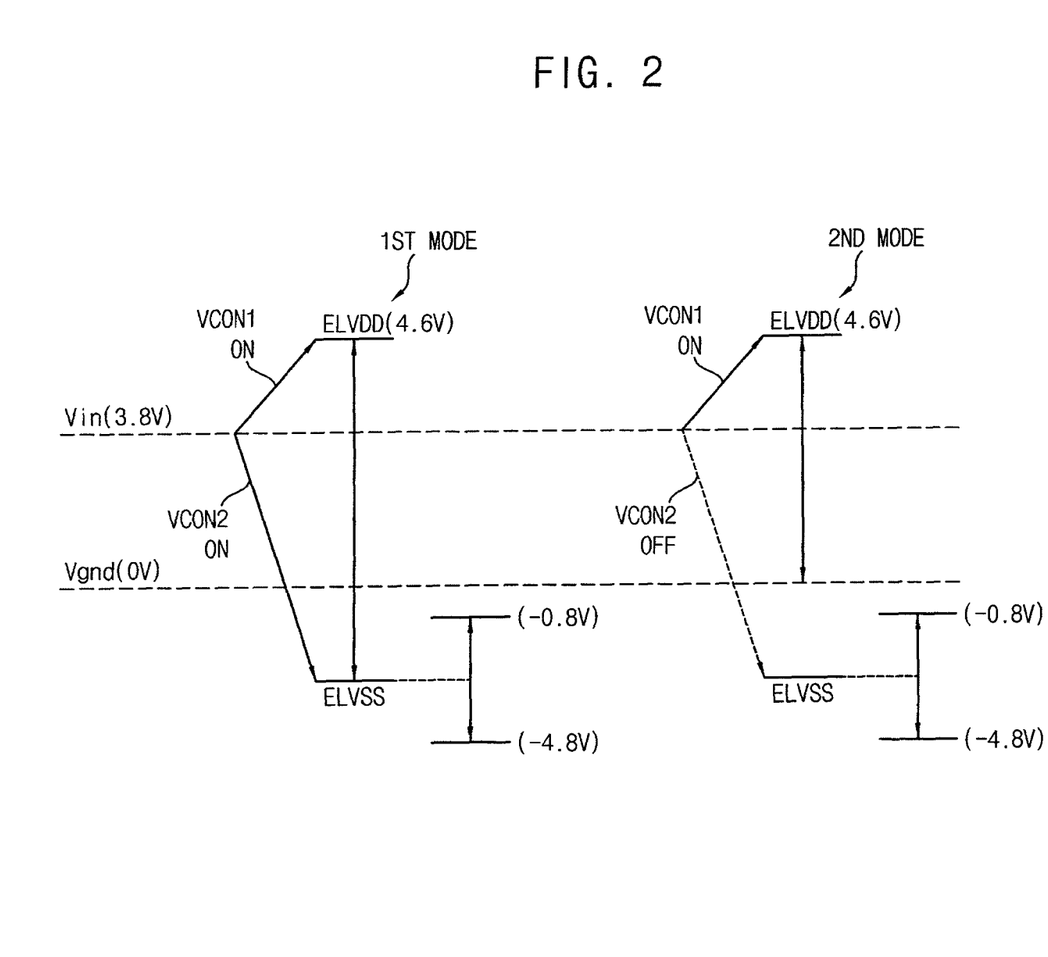
FIG. 2 illustrates an example of operation modes of a power supply circuit.

FIG. 2 illustrates an embodiment of operation modes of a power supply circuit. In FIG. 2, conceptual power rails of the first voltage converter VCON1 generating the first power supply voltage ELVDD have a positive voltage level, and those of the second voltage converter VCON2 generating the second power supply voltage ELVSS have a negative voltage level. The negative voltage level of the second power supply voltage ELVSS may vary according to a size of the display panel 110, brightness of a displayed image, etc. The voltage levels 4.6V, 3.8V, 0V, −0.8V, −4.8 V in FIG. 2 are examples. The voltage levels may be different in other embodiments.

Referring to FIGS. 1 and 2, the power supply circuit 150 may operate in the first mode or in the second mode. In the first mode, both the first and second voltage converters VCON1 and VCON2 are enabled (ON) to provide the first power supply voltage ELVDD having the positive voltage level to the first power node NP1 and the second power supply voltage ELVSS having the negative voltage level to the second power node NP2. In the second mode, the first voltage converter VCON1 is enabled (ON) to provide the first power supply voltage ELVDD to the first power node NP1 and the second voltage converter VCON2 is disabled (OFF) to apply the ground voltage Vgnd to the second power node NP2.

Two kinds of DC-DC converters may be used to power the display panel 110 of the electroluminescent display device 100. The first power supply voltage ELVDD having the positive voltage level and the second power supply voltage ELVSS having the negative voltage level are applied to the display panel 110, and the pixels PX in the display panel 110 emit lights based on the first and second power supply voltages ELVDD and ELVSS. The second voltage converter VCON2, that is, the inverting buck-boost converter, may have lower power efficiency than the first voltage converter VCON1, that is, the boost converter.

To reduce power consumption, the driving voltage applied to the display panel 110 (that is, the difference between the voltages VP1 and VP2 on the power nodes NP1 and NP2) may be set to a smaller value or the driving voltage may be shifted to the positive direction. According to one embodiment, the second mode may be introduced to disable or turn off the second voltage converter VCON2 of the lower power efficiency, to thereby reduce power consumption.

When a relatively large driving current is required for the display panel 110, the negative voltage level of the second power supply voltage ELVSS may be an absolute value of a few volts. In this case, a switch of a large size is required to change the operation mode between the first and second modes, and flickering may occur in the display image because the voltages of large difference are shorted during the mode change. According to one embodiment, switching between the first and second modes may be performed efficiently as described below, to thereby reduce power consumption without degrading quality of the displayed image.

Figure 3:
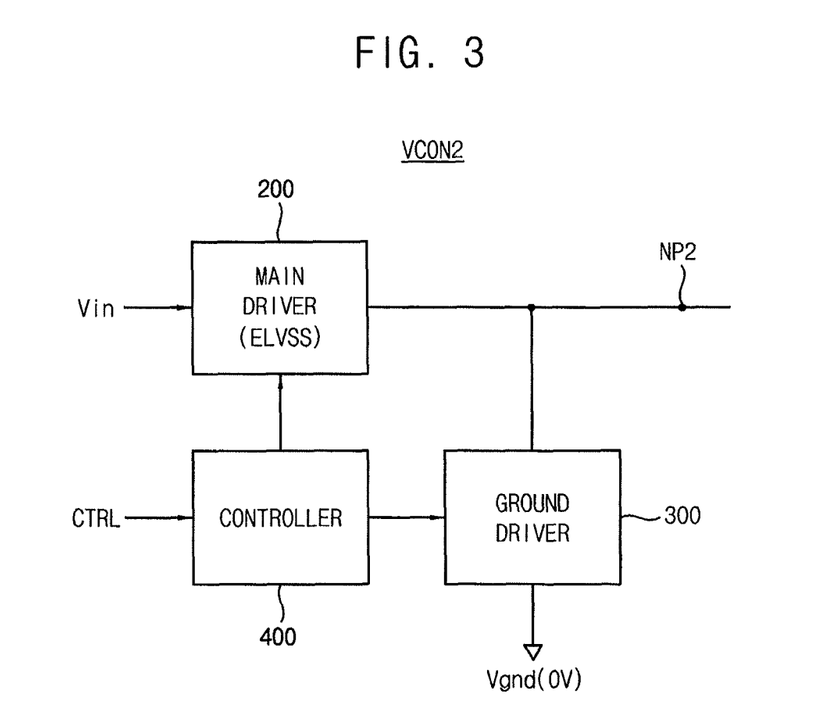
FIG. 3 illustrates an embodiment of a voltage converter.

FIG. 3 illustrates an embodiment of a voltage converter, which, for example, may correspond to the second voltage converter VCON2 among the first and second voltage converters VCON1 and VCON2 in the power supply circuit 150 in FIG. 1.

Referring to FIG. 3, the second voltage converter VCON2 includes a main driver 200, a ground driver 300, and a controller 400. The main driver 200 generates the second power supply voltage ELVSS having the negative voltage level based on the input voltage Vin, and controls an electrical connection between the second power node NP2 and the second power supply voltage ELVSS in response to a main driving signal MDR. As described with reference to FIG. 10, the main driver 200 may include a combination of switches and inductors.

The ground driver 300 controls an electrical connection between the second power node NP2 and the ground voltage Vgnd in response to a ground driving signal GDR. Example embodiments of the ground driver 300 are described with reference to FIGS. 4 through 9.

The controller 400 may control operations of the main driver 200 and the ground driver 300. The controller 400 may generate signals such as the main driving signal MDR, the ground driving signal GDR, etc., based on the control signals CTRL for controlling the main driver 200 and the ground driver 300. At least a portion of the control signals CTRL may be provided from the timing controller 120 in FIG. 1. The control signals CTRL may include a mode signal MOD indicating the first mode or the second mode. The controller 400 may control the main driver 200 and the ground driver 300, such that the second power supply voltage ELVSS is applied to the second power node NP2 in the first mode and the ground voltage Vgnd is applied to the second power node NP2 in the second mode.

Figure 4:
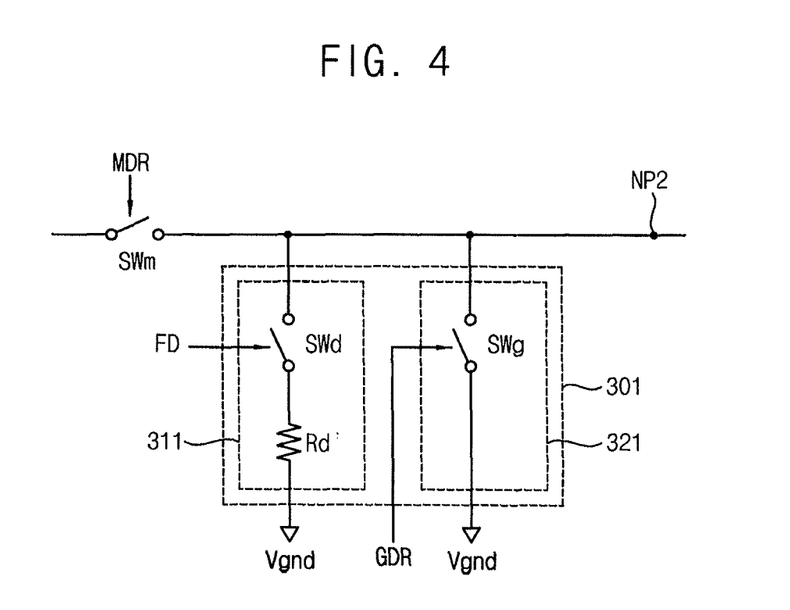
FIG. 4 illustrates an embodiment of a ground driver in the voltage converter.

FIG. 4 illustrates an example embodiment of a ground driver in the voltage converter of FIG. 3. A main driving switch SWm is illustrated together in FIG. 4, which may be included in the main driver 200 in FIG. 3. The main driving switch SWm may perform a switching operation in response to the main driving signal MDR to selectively apply the second power supply voltage ELVSS to the second power node NP2.

Referring to FIG. 4, a ground driver 301 may include a discharging unit 311 and a ground unit 321. The discharging unit 311 is connected between the second power node NP2 and the ground voltage Vgnd, and the discharging unit 311 is turned on in response to a discharging signal FD. The ground unit 321 may include a ground driving switch SWg. The ground driving switch SWg is connected between the second power node NP2 and the ground voltage Vgnd. The ground driving switch SWg is turned on in response to the ground driving signal GDR.

The discharging unit 311 may include a discharging switch SWd that is turned on in response to the discharging signal FD, and a resistor Rd connected in series with the discharging switch SWd between the second power node NP2 and the ground voltage Vgnd. The turn-on resistance of the discharging unit 311 may be set to be greater than the turn-on resistance of the ground driving switch SWg. For example, the ground driving switch SWg may be implemented with one transistor having a small turn-on resistance. The discharging unit 311 may be implemented with one transistor as the discharging switch SWd and the resistor having a significant resistance compared with the turn-on resistance of the switches SWd and SWg. When switching or changing from the first mode to the second mode, the controller 400 may activate the discharging signal FD firstly, and then activate the ground driving signal GDR. Using the discharging unit 311 having a relatively large turn-on resistance, an abrupt change of the driving current of the display panel 110 may be prevented, and thus flickering of the displayed image may be prevented.

Figure 5:
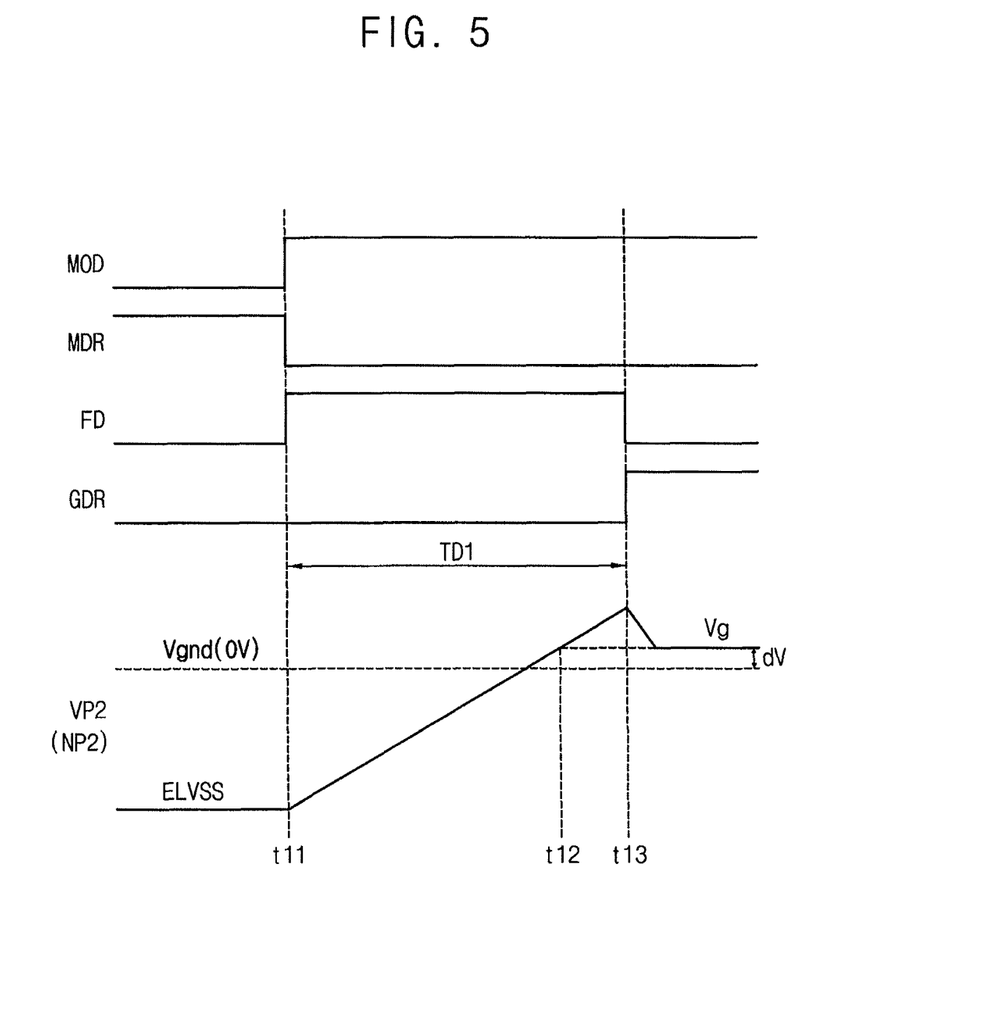
FIG. 5 illustrates an embodiment of a timing diagram for the ground driver.

FIG. 5 illustrates an embodiment of a timing diagram for controlling operations of the ground driver in FIG. 4. In FIG. 5, an example waveform of the voltage VP2 is illustrated on the second power node NP2 when the operation mode is switched from the first mode to the second mode. The mode signal MOD may be provided from the timing controller 120 in FIG. 1 to the power supply circuit 150. For example, the logic low level of the mode signal MOD may indicate the first mode and the logic high level of the mode signal MOD may indicate the second mode.

Referring to FIGS. 3, 4, and 5, the main driving signal MDR is activated in the logic high level in the first mode, to apply the second power supply voltage ELVSS having a negative voltage level from the main driver 200 to the second power node NP2. The discharging signal FD and the ground driving signal GDR are deactivated in the logic low level in the second mode.

When the mode signal MOD transitions from the logic low level to the logic high level at time t11, the controller 400 deactivates the main driving signal MDR in the logic low level to disable the main driver 200 and block the second power supply voltage ELVSS. The controller 400 activates the discharging signal FD to discharge the voltage VP2 on the second power node NP2. The value of the resistor Rd in the discharging unit 311 and/or the internal parasitic resistance may be adjusted to control the time interval for which the voltage VP2 on the second power node NO2 increases from the second power supply voltage ELVSS to the ground voltage Vgnd.

At time t13, the discharging signal FD is deactivated to turn off the discharging switch SWd. Also, the ground driving signal GDR is activated to turn on the ground driving switch SWg. After time t13, the voltage VP2 on the second power node NP2 is maintained at the ground driving voltage Vg.

When the turn-on resistance of the ground driving switch SWg is Rds_on and the driving current flowing through the ground driving switch SWg is Ipanel, the ground driving voltage corresponds to Ipanel*Rds_on. The difference dV between the ground voltage Vgnd and the ground driving voltage Vg may be set to be very small. Thus, the ground voltage Vgnd and the ground driving voltage Vg may be considered as effectively being the same voltage level.

As such, when switching from the first mode to the second mode, the second voltage converter VCON2 may activate the ground driving signal GDR by a first delay time TD1, after deactivating the main driving signal MDR. For example, the ground voltage Vgnd may be applied to the second power node NP2 by the first delay time TD1 after the second power node NP2 is disconnected from the second power supply voltage ELVSS, when switching from the first mode to the second mode. The second power node NP2 may be discharged using the discharging unit 311, having the relatively large turn-on resistance, during the initial time interval t11~t13 of switching from the first mode to the second mode. The second power node NP2 is connected to the ground voltage Vgnd after time t13, by turning on the ground driving switch SWg having the relatively small turn-on resistance. Accordingly power consumption may be reduced without degrading quality of a displayed image as a result of an abrupt change in driving current.

In one embodiment, the discharging unit 311 may be omitted and the ground driving switch SWg may be turned on directly after the first delay time TD1. The first delay time TD1 may be set in advance, taking characteristics of the power supply circuit 150 into consideration.

Even though FIG. 5 illustrates that time t13 (the time when the ground driving switch SWg is turned on) lags behind time t12 when the voltage VP2 on the second power node NP2 reaches the ground driving voltage Vgnd, the ground driving switch SWg may be turned on before time t12. In one embodiment, the first delay time TD1 may be determined by monitoring the voltage VP2 on the second power node NP2, for example, as described with reference to FIGS. 6 and 7.

Figure 6:
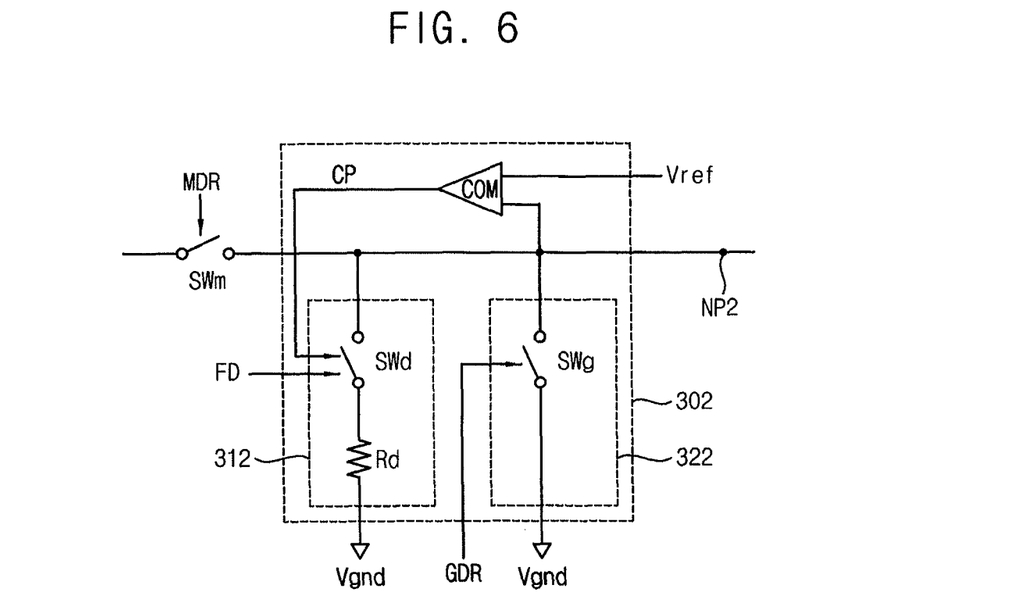
FIGS. 6-8 illustrate other embodiments of a ground driver in the voltage converter.
Figure 7:
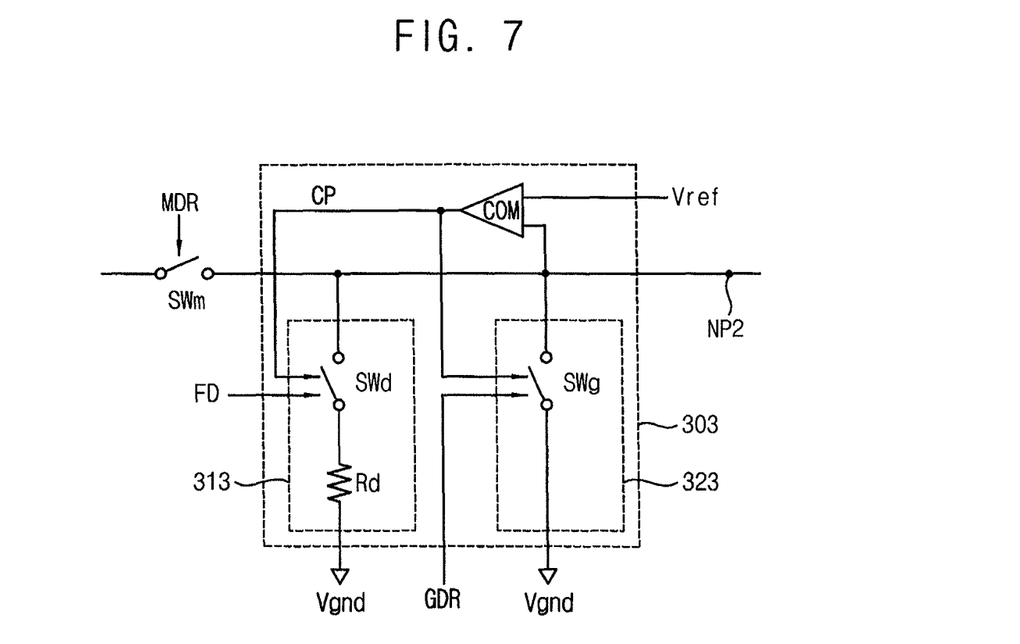
Figure 8:
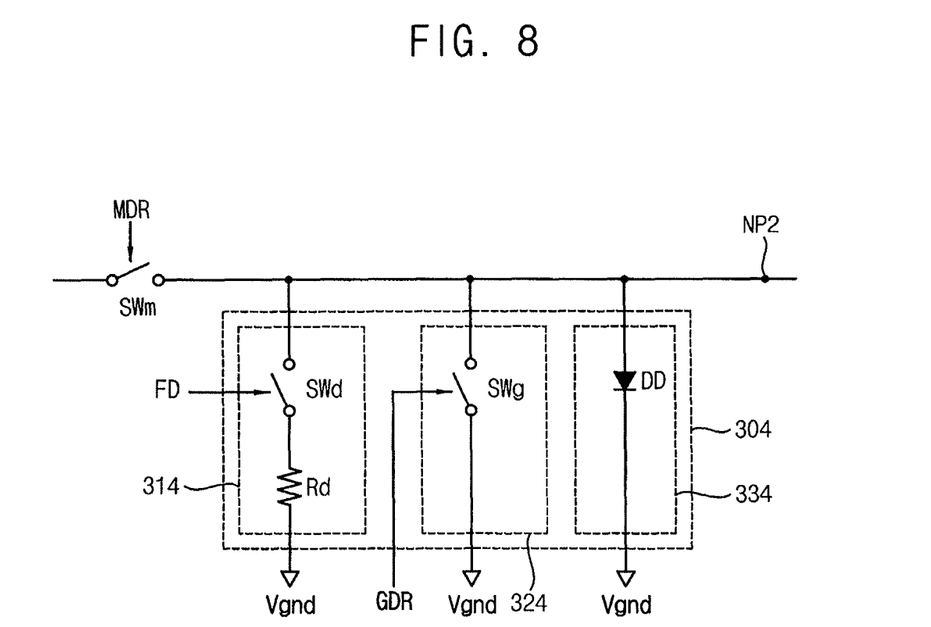

FIGS. 6, 7, and 8 illustrate example embodiments of the ground driver in the voltage converter of FIG. 3. For convenience of description, a main driving switch SWm is illustrated together in FIGS. 6, 7, and 8, which may be included in the main driver 200 in FIG. 3. The main driving switch SWm may perform a switching operation, in response to the main driving signal MDR, to selectively apply the second power supply voltage ELVSS to the second power node NP2.

Referring to FIG. 6, a ground driver 302 may include a discharging unit 312, a ground unit 322, and a comparator COM. The discharging unit 312 is connected between the second power node NP2, and the ground voltage Vgnd and the discharging unit 312 is turned on in response to a discharging signal FD. The ground unit 322 may include a ground driving switch SWg. The ground driving switch SWg is connected between the second power node NP2 and the ground voltage Vgnd. The ground driving switch SWg is turned on in response to the ground driving signal GDR. The discharging unit 312 may include a discharging switch SWd that is turned on in response to the discharging signal FD. A resistor Rd is connected in series with the discharging switch SWd between the second power node NP2 and the ground voltage Vgnd.

The comparator COM compares the voltage VP2 on the second power node NP2 with a reference voltage Vref to generate a comparison signal CP. The reference voltage Vref may be set to be slightly higher than the ground voltage Vgnd. For example, Vref may be set to about 50 mV when the ground voltage Vgnd is 0V. The comparison signal CP is provided to the discharging unit 312, and the discharging unit 312 may be turned on in response to the discharging signal FD and turned off in response to the comparison signal CP.

The discharging signal FD may be deactivated before or after t13 in FIG. 5. The turn-off timing of the discharging switch SWd may be determined, for example, in response to the comparison signal CP. In one embodiment, the discharging unit 312 may further include logic gates, flip-flops, etc. for controlling the discharging switch SWd based on the comparison signal CP. In another embodiment, the comparison signal CP may be provided to the controller 400 in FIG. 3, and the controller 400 may determine the first delay time TD1 based on the comparison signal CP.

Referring to FIG. 7, a ground driver 303 may include a discharging unit 313, a ground unit 323, and a comparator COM. The discharging unit 313 is connected between the second power node NP2 and the ground voltage Vgnd. The discharging unit 313 is turned on in response to a discharging signal FD. The ground unit 323 may include a ground driving switch SWg. The ground driving switch SWg is connected between the second power node NP2 and the ground voltage Vgnd. The ground driving switch SWg is turned on in response to the ground driving signal GDR. The discharging unit 313 may include a discharging switch SWd that is turned on in response to the discharging signal FD. A resistor Rd is connected in series with the discharging switch SWd between the second power node NP2 and the ground voltage Vgnd.

The comparator COM compares the voltage VP2 on the second power node NP2 with a reference voltage Vref to generate a comparison signal CP. The reference voltage Vref may be set to be slightly higher than the ground voltage Vgnd. For example, Vref may be set to about 50 mV when the ground voltage Vgnd is 0V. The comparison signal CP may be provided to the discharging unit 312 and the ground driver 323. The discharging unit 312 may be turned on in response to the discharging signal FD and turned off in response to the comparison signal CP.

The turn-on timing of the ground driving switch SWg may be determined based on the comparison signal CP. In another embodiment, the comparison signal CP may be provided to the controller 400 in FIG. 3, and the controller 400 may determine the first delay time TD1 based on the comparison signal CP.

Referring to FIG. 8, a ground driver 304 may include a discharging unit 314, a ground unit 324, and a clamping unit 334. The discharging unit 314 is connected between the second power node NP2 and the ground voltage Vgnd. The discharging unit 314 is turned on in response to a discharging signal FD. The ground unit 324 may include a ground driving switch SWg. The ground driving switch SWg is connected between the second power node NP2 and the ground voltage Vgnd. The ground driving switch SWg is turned on in response to the ground driving signal GDR. The discharging unit 314 may include a resistor Rd and a discharging switch SWd that is turned on in response to the discharging signal FD. The resistor Rd is connected in series with the discharging switch SWd between the second power node NP2 and the ground voltage Vgnd.

The clamping unit 334 may include a diode DD connected between the second power node NP2 and the ground voltage Vgnd. The diode DD may be a diode, for example, that is used to protect inner circuits from an electrostatic discharge (ESD).

Figure 9:
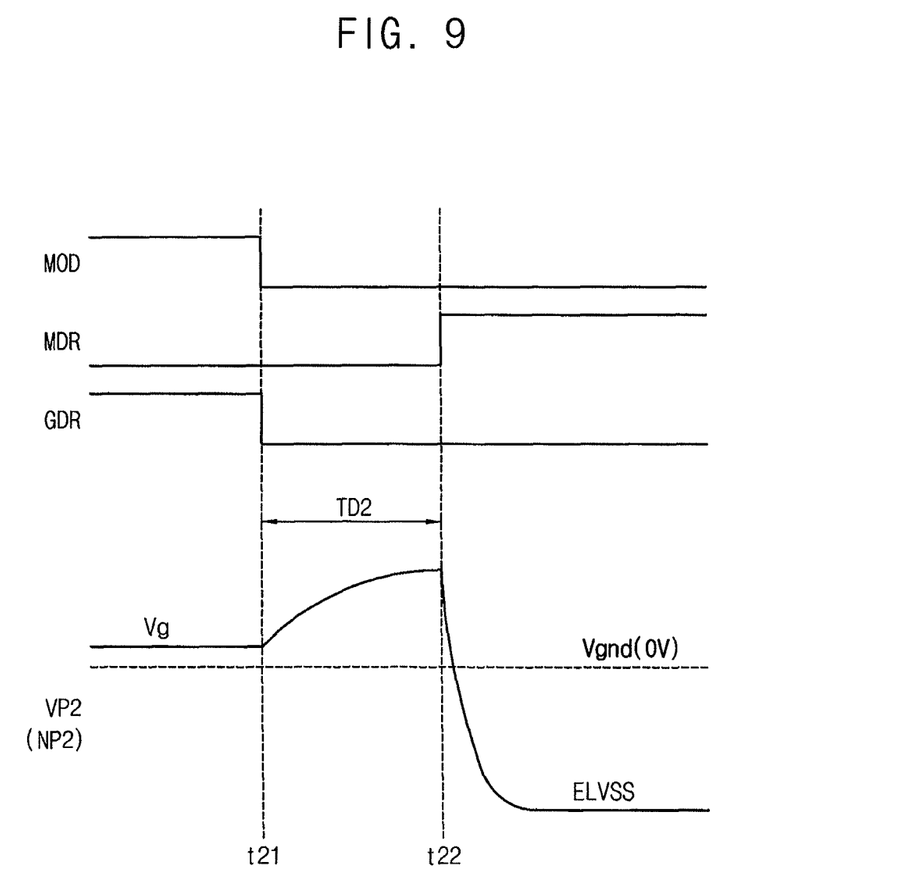
FIG. 9 illustrates an example of a timing diagram for the ground driver of FIG. 8.

FIG. 9 illustrates a timing diagram for controlling operations of the ground driver in FIG. 8. In FIG. 9, an example waveform of the voltage VP2 is illustrated on the second power node NP2 when the operation mode is switched from the second mode to the first mode. The mode signal MOD may be provided from the timing controller 120 in FIG. 1 to the power supply circuit 150. For example, the logic low level of the mode signal MOD may indicate the first mode, and the logic high level of the mode signal MOD may indicate the second mode.

Referring to FIGS. 3, 8, and 9, the ground driving signal GDR is activated in the logic high level in the second mode to apply the ground voltage Vgnd to the second power node NP2. According to the turn-on resistance of the ground driving switch SWg, the ground driving voltage Vg on the second power node NP2 may be slightly higher than the ground voltage Vgnd. The main driving signal MDR is deactivated in the logic low level. The discharging signal FD may maintain the deactivated state when switching from the second mode to the first mode.

When the mode signal MOD transitions from the logic high level to the logic low level at time t21, the controller 400 deactivates the ground driving signal GDR in the logic low level to turn off the ground driving switch SWg and disconnect the second power node NP2 from the ground voltage Vgnd.

After time t21, the voltage VP2 on the second power node NP2 increases by the driving current flowing through the display panel 110. However, the voltage VP2 is clamped by the diode DD, for example, at about 700 mV.

At time t22, the main driving signal MDR is activated in the logic high level to enable the second voltage converter VCON2, to thereby prevent enablement of the main driver 200 during the electrical short state. A second delay time TD2 corresponding to the time interval t21~t22 may be set in advance, taking characteristics of the power supply circuit 150 into consideration.

As such, when switching from the second mode to the first mode, the second voltage converter VCON2 may activate the main driving signal MDR by the second delay time TD2 after deactivating the ground driving signal GDR. In other words, the second power supply voltage ELVSS may be applied to the second power node NP2 by the second delay time TD2, after the second power node NP2 is disconnected from the ground voltage Vgnd, when switching from the second mode to the first mode. The main driver 200 may be enabled after the second power node is stabilized with the clamp voltage of the diode DD, when switching from the second mode to the first mode. Accordingly enablement of the main driver 200 may be prevented during an electrical short state, and thus flickering in the displayed image due to an abrupt change in driving current may be prevented.

Figure 10:
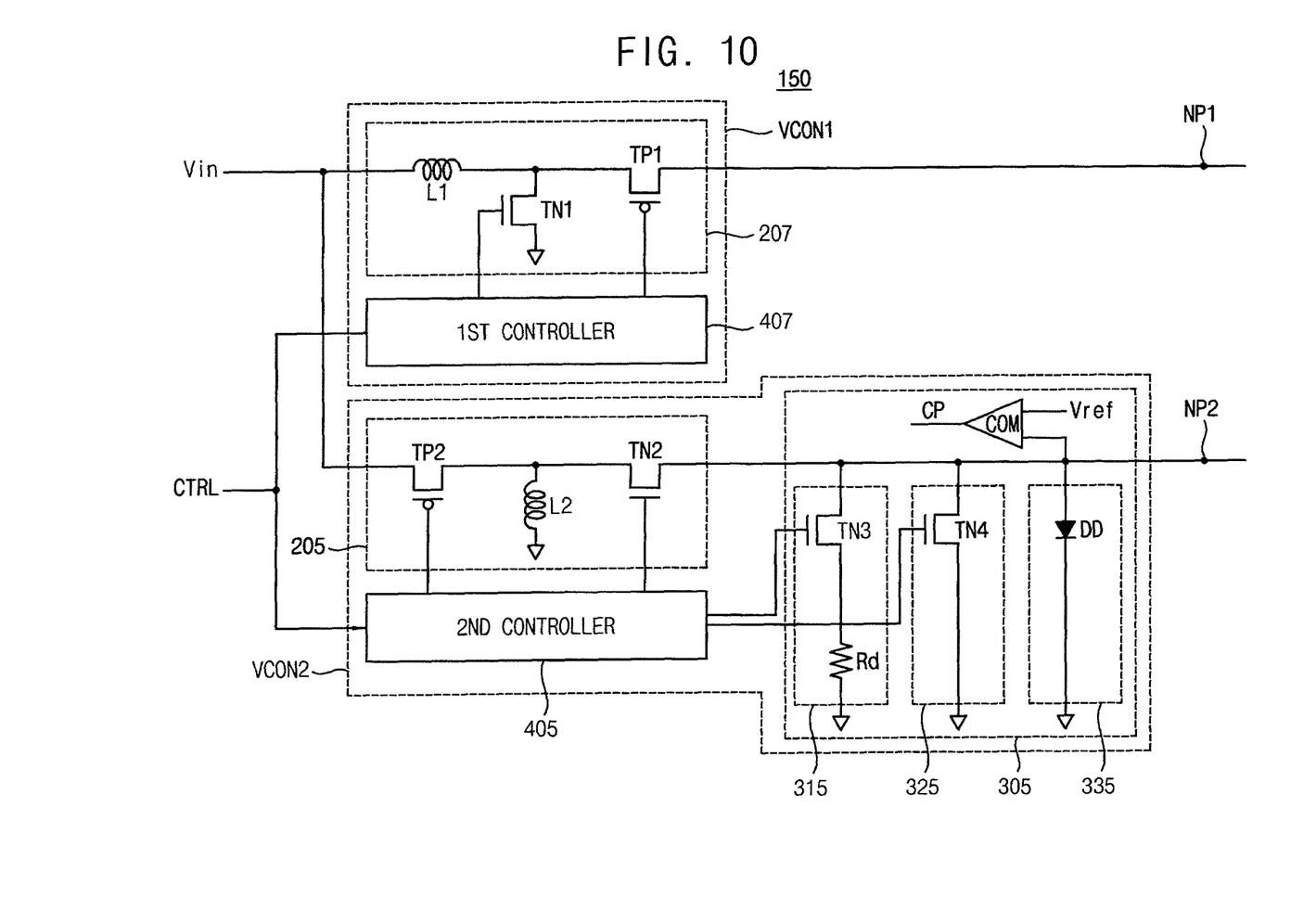
FIG. 10 illustrates an embodiment of a power supply circuit.

FIG. 10 illustrating an embodiment of a power supply circuit 150 which includes a first voltage converter VCON1 and a second voltage converter VCON2. An input voltage Vin provided to the power supply circuit 150 may be a DC voltage such as a battery voltage. At least a portion of control signals CTRL may be provided from the timing controller 120 in FIG. 1. The first and second voltage converters VCON1 and VCON2 may be DC-DC converters. The first voltage VCON1 converter may be a boost converter, and the second voltage converter VCON2 may be an inverting buck-boost converter.

The first voltage converter VCON1 generates a first power supply voltage ELVDD having a positive voltage level based on the input voltage Vin, to drive the first power node NP1 with the first power supply voltage ELVDD. The first voltage converter VCON1 may include a first driver 207 and a first controller 407. The first driver 207 may include an inductor L1 and transistors TN1 and TP1 as switches. The first controller 407 may control switching operations of the transistors TN1 and TP1 to convert the input voltage Vin to the first power supply voltage ELVDD having a positive voltage level.

The second voltage converter VCON2 generates a second power supply voltage ELVSS having a negative voltage level based on the input voltage Vin, to drive the second power node NP2 with the second power supply voltage ELVSS in a first mode. The second voltage converter VCON2 may drive the second power node NP2 with a ground voltage Vgnd in a second mode.

The second voltage converter VCON2 includes a second driver 205, a ground driver 305, and a second controller 405. The second driver 205 includes an inductor L2 and transistors TN2 and TP2 as switches. The second controller 405 controls switching operations of the transistors TN5 and TP5 to convert the input voltage Vin to the second power supply voltage ELVSS having a negative voltage level. The second driver 205 may correspond to the above-described main driver 200, and the transistor Tn2 may correspond to above-described main driving switch SWm.

The ground driver 305 may include a discharging unit 315, a ground unit 325, a clamping unit 335, and a comparator COM. The configuration and operation of these elements maybe the same as described with reference to FIGS. 4 through 9. As illustrated in FIG. 10, the above-described discharging switch SWd and ground driving switch SWg may be implemented with the transistors TN3 and TN4.

Figure 11:
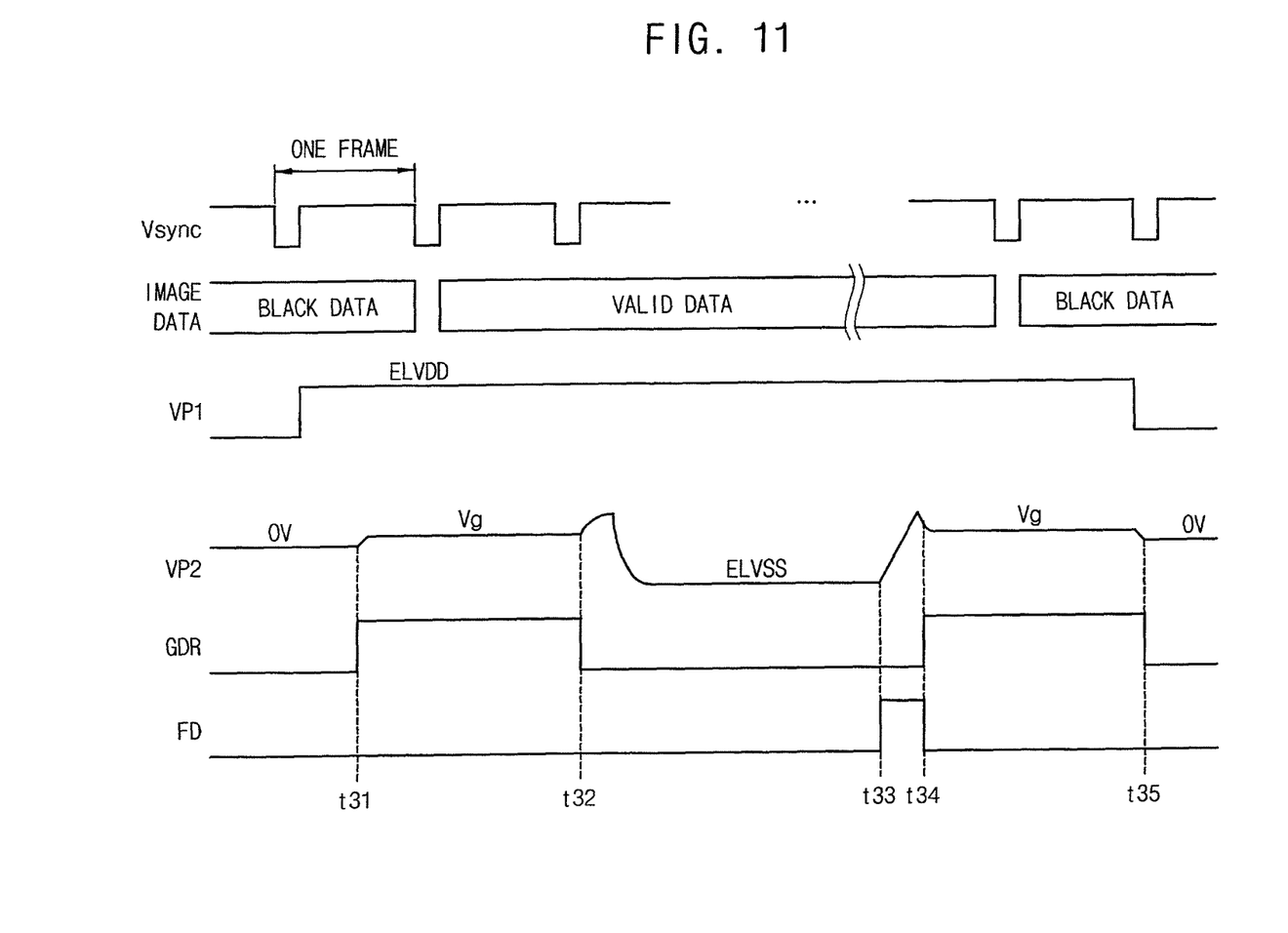
FIG. 11 illustrates an embodiment of a timing diagram for an electroluminescent display device.

FIG. 11 illustrates an embodiment of a timing diagram for controlling an embodiment of an electroluminescent display device. Referring to FIGS. 1, 10, and 11, image data is provided to the electroluminescent display device 100 in a unit of a frame. To prevent degradation of image quality due to change of power, the timings of providing and blocking the voltages VP1 and VP2 on the power nodes set to be during the black data are provided to the display panel 110.

In FIG. 11, the ground driving switch TN4 is turned on at time 31 to apply the ground voltage Vgnd (e.g., 0V) to the second power node NP2. Also, the second power node NP2 is disconnected from the ground voltage Vgnd and the second power supply voltage ELVSS.

At time t32, the ground driving signal GDR is deactivated in the logic low level, and the operation mode is changed from the second mode to the first mode.

At time t33 and time t34, the discharging signal FD and the ground driving signal GDR are sequentially activated, and the operation mode is changed from the first mode to the second mode. As described above, the main driver 205 is enabled and the ground driver 305 is disabled in the first mode. In contrast, the main driver 205 is disabled and the ground driver 305 is enabled in the second mode.

As such, the power supply voltage may be changed and flicker may be prevented in the displayed image. Also, the operation mode may be switched from the first mode to the second mode or from the second mode to the first mode, while the display panel 110 is displaying a valid image, e.g., at time t32 and t33 in FIG. 11.

Figure 12:
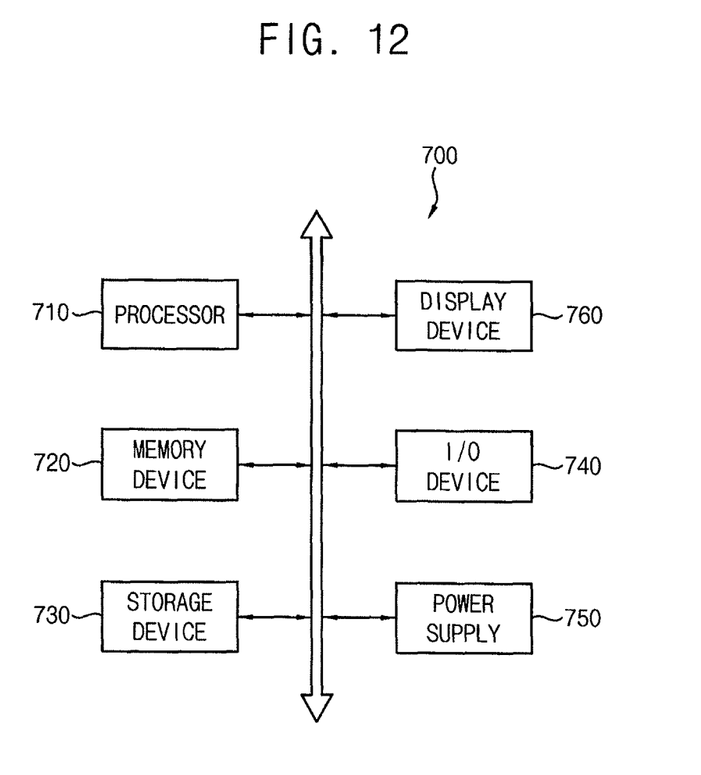
FIG. 12 illustrates an embodiment of a mobile device.

FIG. 12 illustrates an embodiment of a mobile device 700 which includes a processor 710, a memory device 720, a storage device 730, an input/output (I/O) device 740, a power supply 750, and an electroluminescent display device 760. The mobile device 700 may further include a plurality of ports for communicating with a video card, a sound card, a memory card, a universal serial bus (USB) device, and/or other electronic systems.

The processor 710 may perform various computing functions or tasks. The processor 710 may be, for example, a microprocessor or a central processing unit (CPU). The processor 710 may be connected to other components via an address bus, a control bus, a data bus, etc. Further, the processor 710 may be coupled to an extended bus such as a peripheral component interconnection (PCI) bus.

The memory device 720 may store data for operations of the mobile device 700. For example, the memory device 720 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano-floating gate memory (NFGM) device, a polymer random access memory (PoRAM) device, a magnetic random access memory (MRAM) device, a ferroelectric random access memory (FRAM) device, and/or at least one volatile memory device such as a dynamic random access memory (DRAM) device, a static random access memory (SRAM) device, or a mobile dynamic random access memory (mobile DRAM) device.

The storage device 730 may be, for example, a solid state drive (SSD) device, a hard disk drive (HDD) device, a CD-ROM device, etc. The I/O device 740 may be, for example, an input device such as a keyboard, a keypad, a mouse, a touch screen, and/or an output device such as a printer, a speaker, etc. The power supply 750 may supply power for operating the mobile device 700. The electroluminescent display device 760 may communicate with other components via the buses or other communication links.

As described with reference to FIGS. 1 through 11, the electroluminescent display device 760 may turn off the second voltage converter generating the second power supply voltage having a negative voltage level, and may replace the second power supply voltage with the ground voltage to reduce power consumption. In addition, the electroluminescent display device 760 may reduce power consumption without degrading image quality through efficient switching between the second power supply voltage having a negative voltage level and the ground voltage.

The present embodiments may be applied to any mobile device or any computing device. For example, the present embodiments may be applied to a cellular phone, a smart phone, a tablet computer, a personal digital assistant (PDA), a portable multimedia player (PMP), a digital camera, a music player, a portable game console, a navigation system, a video phone, a personal computer (PC), a server computer, a workstation, a tablet computer, a laptop computer, etc.

By way of summation and review, one type of power supply circuit for an electroluminescent display device has two voltage converters, which provide a positive power supply voltage ELVDD and the negative power supply voltage ELVSS to a display panel. This type of circuit has been shown to allow flicker or other adverse effects.

In accordance with one or more of the aforementioned embodiments, a switch operation is performed between a second power supply voltage having a first (e.g., negative) voltage level and a ground voltage Vgnd. To prevent flickering in the displayed image, a ground driver controls the timing of the electrical connection between a second power node and the ground voltage Vgnd. With such an arrangement, an electroluminescent display device has high efficiency with respect to variable driving currents to reduce power consumption.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A power supply circuit, comprising:
a first voltage converter to generate a first power supply voltage having a first voltage level based on an input voltage, the first power supply voltage to drive a first power node of a display in a first mode and in a second mode; and
a second voltage converter to generate a second power supply voltage having a second voltage level based on the input voltage, a second power node of the display to be driven by the second power supply voltage in the first mode and to be driven by a ground voltage in the second mode, wherein the second voltage converter includes:
a main driver to generate the second power supply voltage having the second voltage level based on the input voltage, and to control an electrical connection between the second power node and the second power supply voltage in response to a main driving signal;
a ground driver to control an electrical connection between the second power node and the ground voltage in response to a ground driving signal; and
a controller to control operations of the main driver and the ground driver,
wherein the ground driver includes:
a discharging circuit connected between the second power node and the ground voltage, the discharging circuit to turn on in response to a discharging signal;
a ground driving switch connected between the second power node and the ground voltage, the ground driving switch to turn on in response to the ground driving signal; and
a comparator to compare a voltage on the second power node with a reference voltage to generate a comparison signal,
wherein the controller is to activate the discharging signal at a first time, and the ground driving signal at a second time after the first time, when switching from the first mode to the second mode, and a turn-on resistance of the discharging circuit is greater than a turn-on resistance of the ground driving switch, and wherein the discharging circuit is to turn on in response to the discharging signal and to turn off in response to the comparison signal.

2. The circuit as claimed in claim 1, wherein:

the second voltage converter is to apply the ground voltage to the second power node based on a first delay time, after the second power node is disconnected from the second power supply voltage, when switching from the first mode to the second mode, and the second voltage converter is to apply the second power supply voltage to the second power node based on a second delay time, after the second power node is disconnected from the ground voltage, when switching from the second mode to the first mode.

3. The circuit as claimed in claim 1, wherein the ground driver includes a ground driving switch connected between the second power node and the ground voltage, the ground driving switch to turn on in response to the ground driving signal.

4. The circuit as claimed in claim 3, wherein the controller is to activate the ground driving signal based on a first delay time, after the main driving signal is deactivated, when switching from the first mode to the second mode.

5. The circuit as claimed in claim 1, wherein the first delay time is based on a voltage of the second power node.

6. The circuit as claimed in claim 3, wherein the controller is to activate the main driving signal based on a second delay time, after the ground driving signal is deactivated, when switching from the second mode to the first mode.

7. The circuit as claimed in claim 1, wherein the ground driver includes: a discharging circuit connected between the second power node and the ground voltage, the discharging circuit to turn on in response to a discharging signal; and a ground driving switch connected between the second power node and the ground voltage, the ground driving switch to be turned on in response to the ground driving signal.

8. The circuit as claimed in claim 7, wherein the controller is to activate the discharging signal at a first time, and is to activate the ground driving signal at a second time after the first time, when switching from the first mode to the second mode.

9. The circuit as claimed in claim 7, wherein a turn-on resistance of the discharging circuit is greater than a turn-on resistance of the ground driving switch.

10. The circuit as claimed in claim 7, wherein the discharging circuit includes:

a discharging switch to turn on in response to the discharging signal; and a resistor connected in series with the discharging switch between the second power node and the ground voltage.

11. The circuit as claimed in claim 1, wherein a turn-on timing of the ground driving switch is based on the comparison signal.

12. The circuit as claimed in claim 1, wherein the ground driver includes:

a ground driving switch connected between the second power node and the ground voltage, the ground driving switch to turn on in response to the ground driving signal; and a diode connected between the second power node and the ground voltage.

13. The circuit as claimed in claim 12, wherein the main driver is enabled after the second power node is stabilized with a clamp voltage of the diode when switching from the second mode to the first mode.

14. The circuit as claimed in claim 12, wherein the diode is to protect inner circuits from an electrostatic discharge (ESD).

15. An electroluminescent display device, comprising:

a display panel connected between a first power node and a second power node, the display panel including a plurality of pixels;

a first voltage converter to generate a first power supply voltage having a first voltage level based on an input voltage, the first power supply voltage to drive the first power node in a first mode and in a second mode; and a second voltage converter to generate a second power supply voltage having a second voltage level based on the input voltage, wherein the second power node is driven by the second power supply voltage in the first mode and is driven by a ground voltage in the second mode, wherein the second voltage converter includes:

a main driver to generate the second power supply voltage having the second voltage level based on the input voltage, and to control an electrical connection between the second power node and the second power supply voltage in response to a main driving signal;

a ground driver to control an electrical connection between the second power node and the ground voltage in response to a ground driving signal; and a controller to control operations of the main driver and the ground driver, wherein the ground driver includes:

a discharging circuit connected between the second power node and the ground voltage, the discharging circuit to turn on in response to a discharging signal;

a ground driving switch connected between the second power node and the ground voltage, the ground driving switch to turn on in response to the ground driving signal; and a comparator to compare a voltage on the second power node with a reference voltage to generate a comparison signal, wherein the controller is to activate the discharging signal at a first time, and the ground driving signal at a second time after the first time, when switching from the first mode to the second mode, and a turn-on resistance of the discharging circuit is greater than a turn-on resistance of the ground driving switch, and wherein the discharging circuit is to turn on in response to the discharging signal and to turn off in response to the comparison signal.

16. The device of claim 15, wherein the second voltage converter switches from the first mode to the second mode, or from the second mode to the first mode, while the display panel is displaying a valid image.

17. The circuit as claimed in claim 1, wherein:
the first voltage level is a positive voltage level, and
the second voltage level is a negative voltage level.

18. The device as claimed in claim 15, wherein:
the first voltage level is a positive voltage level, and
the second voltage level is a negative voltage level.

* * * * *